(12) United States Patent
Felknor et al.

(10) Patent No.: US 8,234,815 B2
(45) Date of Patent: Aug. 7, 2012

(54) TERRACED GARDEN PLANTER

(75) Inventors: Wilson A. Felknor, Lenoir City, TN (US); James Robert Ferron, Loudon, TN (US); Benjamin James Ferron, legal representative, Pittsburg, PA (US)

(73) Assignee: Felknor Ventures LLC, Knoxville, TN (US)

( * ) Notice: Subject to any disclaimer, the term of this patent is extended or adjusted under 35 U.S.C. 154(b) by 35 days.

(21) Appl. No.: 12/799,791

(22) Filed: Apr. 30, 2010

(65) Prior Publication Data
US 2010/0287834 A1 Nov. 18, 2010

Related U.S. Application Data

(60) Provisional application No. 61/215,052, filed on May 1, 2009.

(51) Int. Cl.
*A01G 9/02* (2006.01)

(52) U.S. Cl. .......................... 47/82; 47/83; 47/86; 47/39

(58) Field of Classification Search .................. 47/66.1, 47/66.6, 79, 82, 83, 86, 39, 45, 46, 47
See application file for complete search history.

(56) References Cited

U.S. PATENT DOCUMENTS

| | | | | |
|---|---|---|---|---|
| D224,746 | S | * | 9/1972 | Kyle ............................ D11/144 |
| 4,032,098 | A | * | 6/1977 | Marschak ...................... 248/165 |
| 5,615,446 | A | * | 4/1997 | Cetnarowski ................... 15/261 |
| 6,442,895 | B1 | * | 9/2002 | Van Roey .......................... 47/82 |
| 6,612,073 | B1 | * | 9/2003 | Powell et al. ..................... 47/83 |
| 6,840,008 | B1 | * | 1/2005 | Bullock et al. .................... 47/82 |
| 2007/0266627 | A1 | * | 11/2007 | Shelton ............................. 47/45 |
| 2008/0263949 | A1 | * | 10/2008 | Early ................................. 47/83 |
| 2010/0051762 | A1 | | 3/2010 | Felknor et al. |

* cited by examiner

*Primary Examiner* — Rob Swiatek
*Assistant Examiner* — Lisa Tsang
(74) *Attorney, Agent, or Firm* — Michael E. McKee

(57) ABSTRACT

A planter including a center post and a series of upwardly-opening disc-shaped growing compartments which are arranged in a sequential relationship along the length of the center post and are suspended from the top of the center post. Each of the growing compartments has a center opening through which the center post extends so that the growing compartments are maintained in a centered relationship about the center post. Furthermore, a lowermost growing compartment has a substantially solid bottom for containing dirt or potting soil placed therein, and the remainder of the growing compartments have bottoms within which including relatively large openings are defined to accommodate the passage of relatively large clumps of dirt or potting soil through the bottoms thereof so that each of the growing compartments can be filled with dirt or potting soil placed into the uppermost growing compartment.

16 Claims, 6 Drawing Sheets

TERRACED GARDEN PLANTER

The benefit of Provisional Application Ser. No. 61/215,052, filed May 1, 2009 and TERRACED GARDEN PLANTER, is hereby claimed. The disclosure of this referenced provisional application is incorporated herein by reference.

BACKGROUND OF THE INVENTION

This invention relates generally to garden accessories and relates, more particularly, to planters within which plants are grown.

The class of planters with which this invention is to be compared includes those which include a vertically-arranged series of growing compartments for containing dirt or potting soil. Typically, the growing compartments are accessible at the edges thereof for planting seeds or transplanting plants for continued growth within the dirt or potting soil contained within the growing compartments.

Examples of planters of the aforedescribed class are shown and described in U.S. Pat. Nos. 5,438,797, 6,092,333 and 3,293,798.

It is an object of the present invention to provide a planter of the aforedescribed class whose growing compartments can be loaded with dirt or potting soil from the uppermost compartment and can be tended from positions alongside the planter with relative ease.

Accordingly, it is an object of the present invention to provide a new and improved planter of the aforedescribed class.

Another object of the present invention is to provide such a planter whose growing compartments can be loaded with dirt or potting soil from the uppermost growing compartment thereof.

Still another object of the present invention is to provide such a planter whose growing compartments remain centered about the vertical centerline of the planter.

Yet another object of the present invention is to provide such a planter whose growing compartments are suspended from the edges thereof.

A further object of the present invention is to provide such a planter whose growing compartments increase in size as a path is traced downwardly along the vertical centerline of the planter to provide growth regions for plants growing therein which increase in size as a path is traced downwardly along the vertical centerline the planter.

A still further object of the present invention is to provide such a planter which is supported over an underlying floor by way of a stand which rests upon the floor.

One more object of the present invention is to provide such a planter which is uncomplicated in structure, yet effective in operation.

SUMMARY OF THE INVENTION

This invention resides in a planter including a center post which is arranged in a vertical orientation and has a top. Moreover, the planter also includes a series of growing compartments which are arranged in a sequential relationship along the length of and below the top of the center post. Each of the growing compartments has a center opening through which the center post extends so that the growing compartments are maintained in a centered relationship about the center post. The growing compartments include an uppermost growing compartment and a lowermost growing compartment. The lowermost growing compartment has a substantially solid bottom for containing dirt or potting soil placed therein, and the remainder of the growing compartments have bottoms within which openings are defined to accommodate the passage of relatively large clumps of dirt or potting soil through the bottoms thereof so that each of the growing compartments can be filled with dirt or potting soil placed into the uppermost growing compartment. In addition, the growing compartments are suspended from the top of the post by tension members which are joined to the post.

DETAILED DESCRIPTION OF AN ILLUSTRATIVE EMBODIMENT

Figure 1:
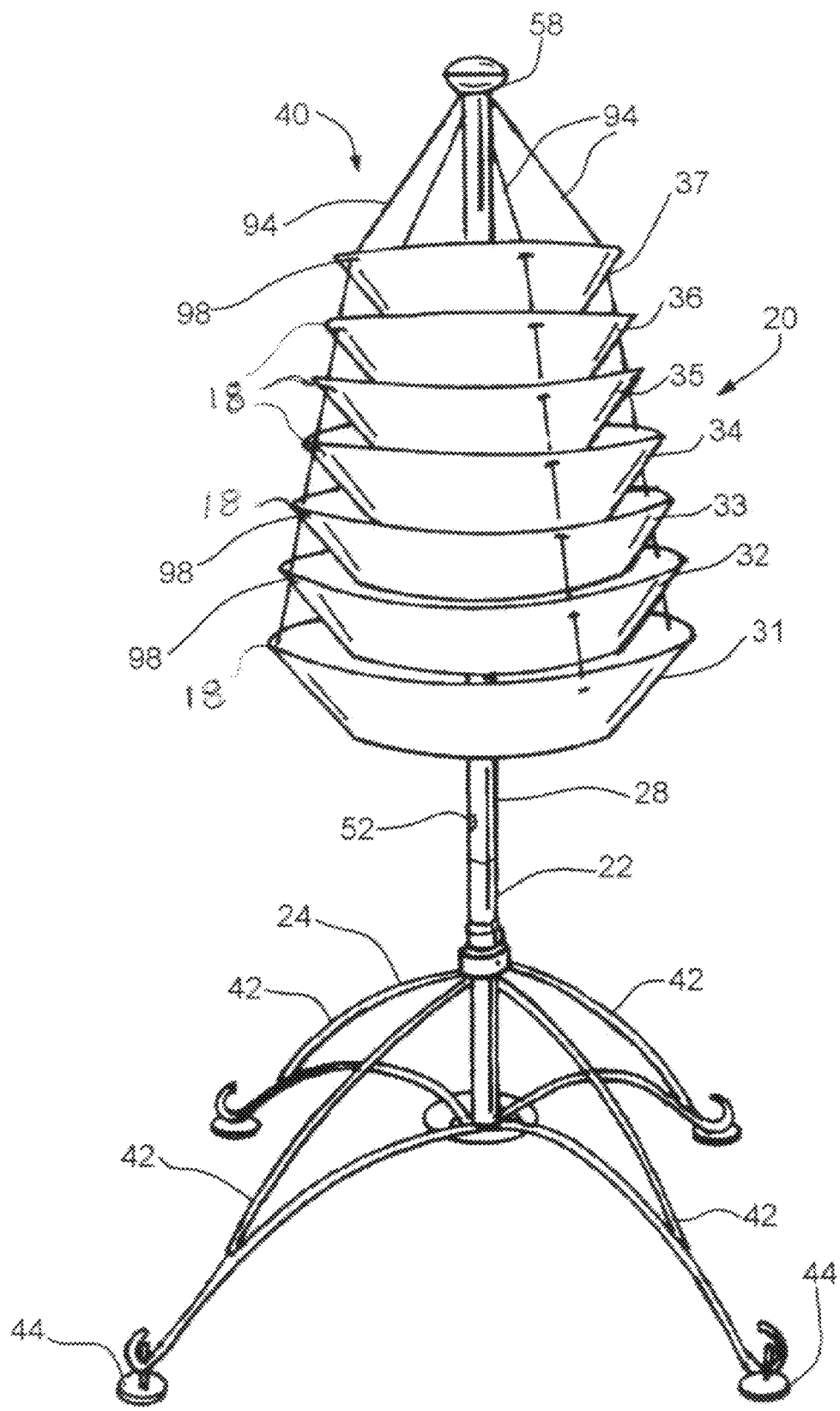
FIG. 1 is a perspective view of a planter within which features of the present invention are embodied.

Turning now to the drawings in greater detail and considering first FIG. 1, there is illustrated an embodiment, generally indicated 20, of a planter within which features of the present invention are embodied. The planter 20 includes a stand 22 including a base assembly 24 which is adapted to rest upon the floor 26 or another underlying support surface and a center post 28 which is supported by the base assembly 22 in a substantially vertical orientation. The planter 20 also includes a plurality of growing compartments 31-37 which are arranged about and disposed sequentially along the length of the center post 28 and which are suspended from the top of the post 28 by suitable tension means, generally indicated 40. The depicted planter 20 has seven growing compartments 31-37, but a planter can possess an alternative number of growing compartments in accordance with the broader aspects of this invention.

The base assembly 24 includes a plurality of (e.g. four) leg members 42 which are regularly disposed about the center post 28 and which interfit with the center post 28 in a manner which rigidly connects the leg member 42 to the center post 28. The base assembly 24 and the manner in which the base assembly 24 cooperates with the center post 28 has been described in detail in applicants' earlier U.S. patent application Ser. No. 12/380,388, filed Feb. 26, 2009 (now Publication No. US-2010-0051762-A1), so that a detailed description of the base assembly 24 is not believed to be necessary. Suffice it to say that the leg members 42 collectively span a relatively large area of the floor 26 so that the center post 28 is supported by the base assembly 24 in a relatively stable condition, and there are provided rotatable shanks 44 associated with at least two feet of the base assembly 24 which enables the stand 22 to be adjusted, or leveled, upon an underlying floor 22 so that the center post 28 is directed substantially vertically from the floor 26. The disclosure of this referenced application Ser. No. 12/380,388 (now Publication No. US-2010-0051762-A1) is incorporated herein by reference.

Figure 2:
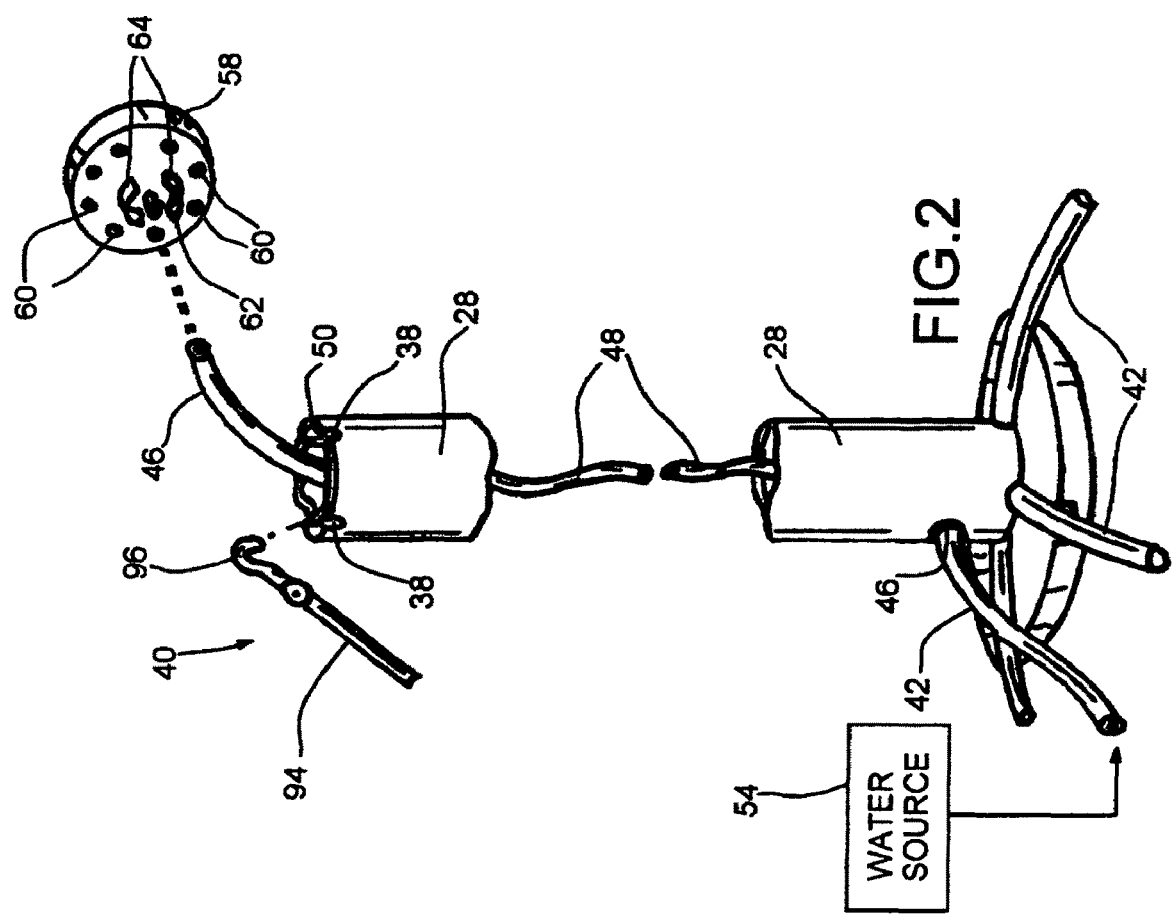
FIG. 2 is a fragmentary view of the center post and stand of the FIG. 1 planter and depicting the irrigation system utilized with the planter.

With reference to FIG. 2, the center post 28 is hollow along its length and includes an opening 46 (FIG. 2) which permits the passage of a water conduit, or tube 48, therethrough and a plurality of (e.g. four) notches 38 which are regularly spaced around the top, indicated 50, of the post 28. Provided along the length of the center post 28 is a pin 52 (FIG. 1) which extends transversely through the post 28 and which rests upon the top of a (lower) segment of the post 28. This pin 52 enables the portion of the stand 20 disposed above the pin 52 to be rotated by a user to alter the exposure of the growing compartments 31-37 to the available sunlight. For a more detailed description of the base assembly 24 and its cooperation with the lower end of the center post 28, reference can be had to the aforementioned U.S. patent application Ser. No. 12/380,388 (now Publication No. US-2010-0051762-A1), the disclosure of which is incorporated herein by reference.

For providing water to the uppermost growing compartment 37 and with reference again to FIG. 2, the water tube 48 is connected at one end to a water source 54 (such as a garden hose or water faucet), passes through the opening 46 provided at the lower end of the post 28 and extends upwardly through the hollow interior of the post 28 for connection to a manifold cap 58. The cap 58 (best shown in FIG. 2) is bulbous in appearance, has a hollow interior and a series of (e.g. eight) discharge openings 60 which are regularly spaced about the underside of the cap 58.

Centrally disposed on the underside of the cap 58 is a nipple 62 which is adapted to be connected to (e.g. received by) the upper end of the tube 48 for delivery of water conducted by the tube 48 to the interior of the cap 58. The cap 58 further includes a plurality of downwardly-extending protuberances 64 which are adapted to be nestingly accepted by the upper end of the center post 28 for securement of the cap 58 to the top of the center post 28. It follows that water which is conducted to the cap 58 by way of the tube 48 is thereafter directed downwardly from the discharge openings 60 provided in the cap 58 and onto the uppermost growing compartment 37.

Figure 3:
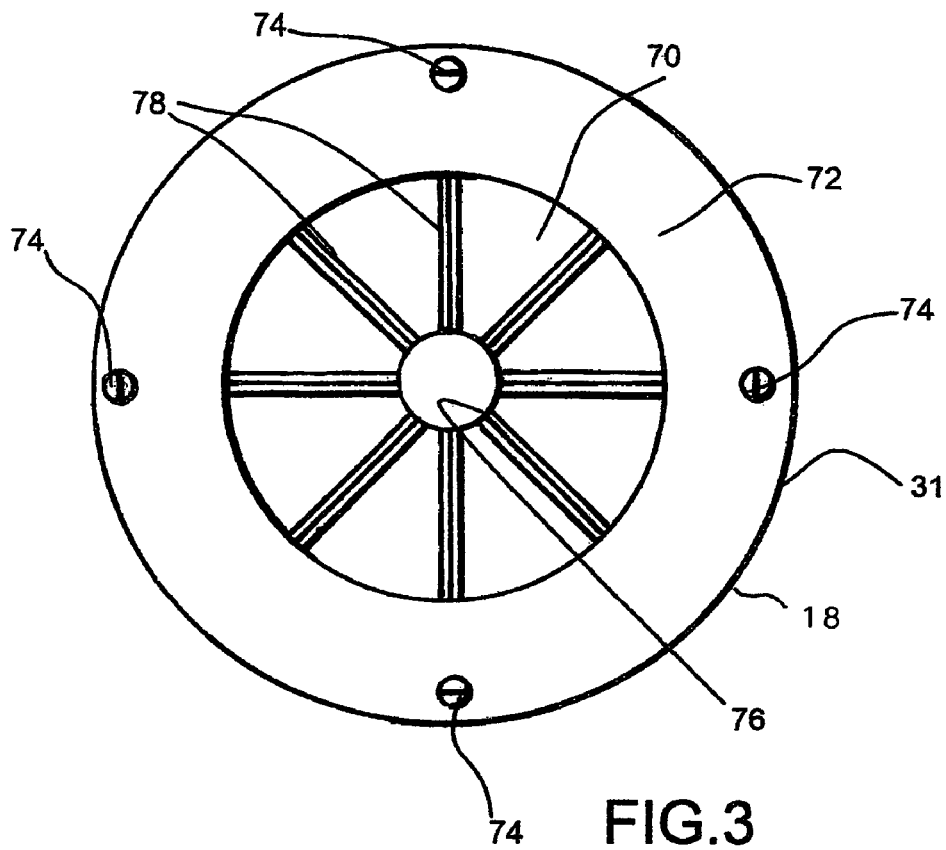
FIG. 3 is a plan view of the lowermost (as shown in FIG. 1) growing compartment of the FIG. 1 planter.
Figure 4:
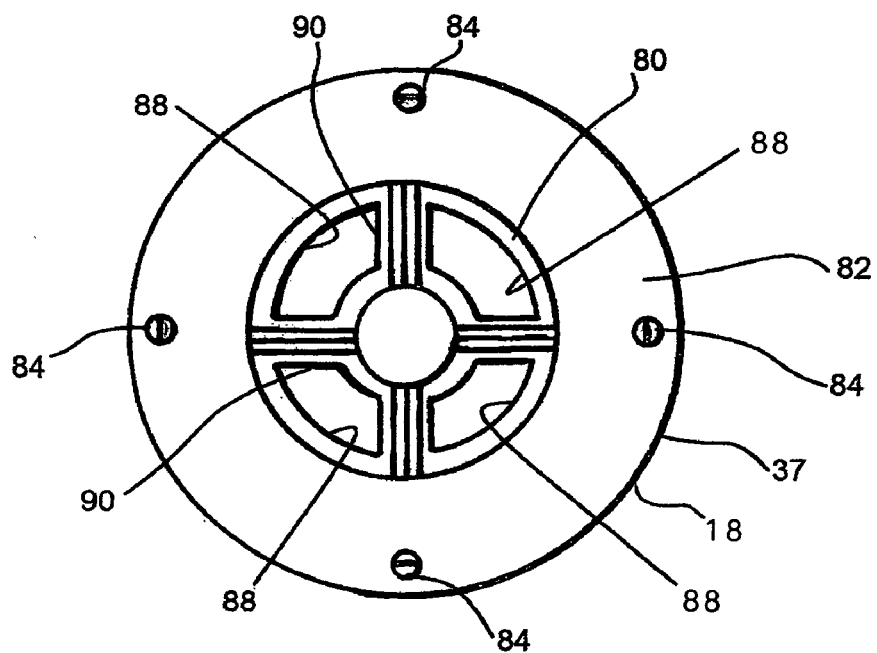
FIG. 4 is a plan view of another growing compartment of the FIG. 1 planter.

With reference to FIGS. 1, 3 and 4, each growing compartment 31-37 is somewhat disc-shaped in form and is arranged about the center post 28 so that the disc shape of the compartment opens generally upwardly. Furthermore and as best shown in FIG. 1, the diameter of the growing compartments 31-37 increase in size as a path is traced downwardly along the center post 28. Such a difference in size of the growing compartments 31-37 yields growing regions (for seeds or plants transplanted therein) within the compartments 31-37 which increase in size as a path is traced downwardly along the post 28 and provide the planter 20 with an appealing, terraced appearance. Each growing compartment 31-37 of the depicted planter 20 is constructed of steel, but alternative materials such as plastic, can be used.

With reference to FIG. 3, the lowermost (as viewed in FIG. 1) growing compartment 31 includes a bottom, or centrally-disposed, portion 70 and an edge portion 72 which is joined to the bottom portion 70 therearound. The edge portion 72 is sloped upwardly as a path is traced radially outwardly along the compartment 31 and provides the bowl-shaped sidewalls for the compartment 31 within which dirt or potting soil is eventually positioned for growth of seeds or plants planted therein. In addition, the edge portion 72 defines a plurality of (e.g. four) openings 74 along the peripheral edges 18 thereof with which the compartment 31 is suspended from the top of the center post 28.

The bottom portion 70 of the lowermost growing compartment 31 defines a center hole, or opening 76, through which the center post 28 extends, and the center opening 76 is slightly larger in diameter than that of the center post 28 so that when fitted about the post 28, the growing compartment 31 is tightly fitted thereabout. The remainder of the bottom portion 70 is solid and thereby capable of supporting dirt or potting soil placed therein so that none of the dirt or potting soil is permitted to fall through the compartment 31 from the upper side thereof. The bottom portion 70 further includes a plurality of radially-extending ribs 78 formed therein to enhance the strength of the compartment 31 when filled with dirt or potting soil.

With reference to FIGS. 1 and 4, each of the remainder of the growing compartments 32-37 (exemplified by growing compartment 37 of FIG. 4) includes a bottom, or centrally-disposed, portion 80 and an edge portion 82 which is joined to the bottom portion 80 therearound and extends outwardly to a peripheral edge 18. The edge portion 82 is sloped upwardly as a path is traced radially outwardly along the compartment and provides the bowl-shaped sidewalls for the compartment within which dirt or potting soil is eventually positioned for growth of seeds or plants planted therein. In addition, the edge portion 82 defines a plurality of openings 84 along the edges thereof with which the compartment is suspended from the top of the center post 28.

The bottom portion 80 of each of the remainder growing compartments 32-37 defines a center hole, or opening 86, through which the center post 28 extends, and the center opening 86 is slightly larger in diameter than that of the center post 28 so that when fitted about the post 28, the growing compartment is tightly fitted thereabout. The remainder of the bottom portion 80 is provided with relatively large openings 88 through which large amounts (e.g. clumps) of dirt and potting soil are permitted to pass when the planter 20 is initially filled with dirt and/or potting soil. Within the depicted planter 20, the openings 88 provided in the growing compartments accommodate the passage therethrough of a substantially spherically-shaped clump of dirt which can be as large as about 1.5 inches in diameter. Such large openings have been found to facilitate a rapid filling of the growing compartments of the planter 20 with dirt or potting soil.

Although the bottom 80 can take any of a number of alternative forms, the bottoms 80 of the compartments 32-37 of the depicted planter 20 each include a series (e.g. four) regularly-spaced and radially-extending spokes 90 which extend from the center opening 86 to a location adjacent the edge portion 82 of the compartment, and the space provided between these spokes 90 provides the relatively large openings 88 through which the dirt and potting soil is permitted to pass downwardly therethrough when the planter 20 is initially filled with dirt or potting soil for use.

Figure 5:
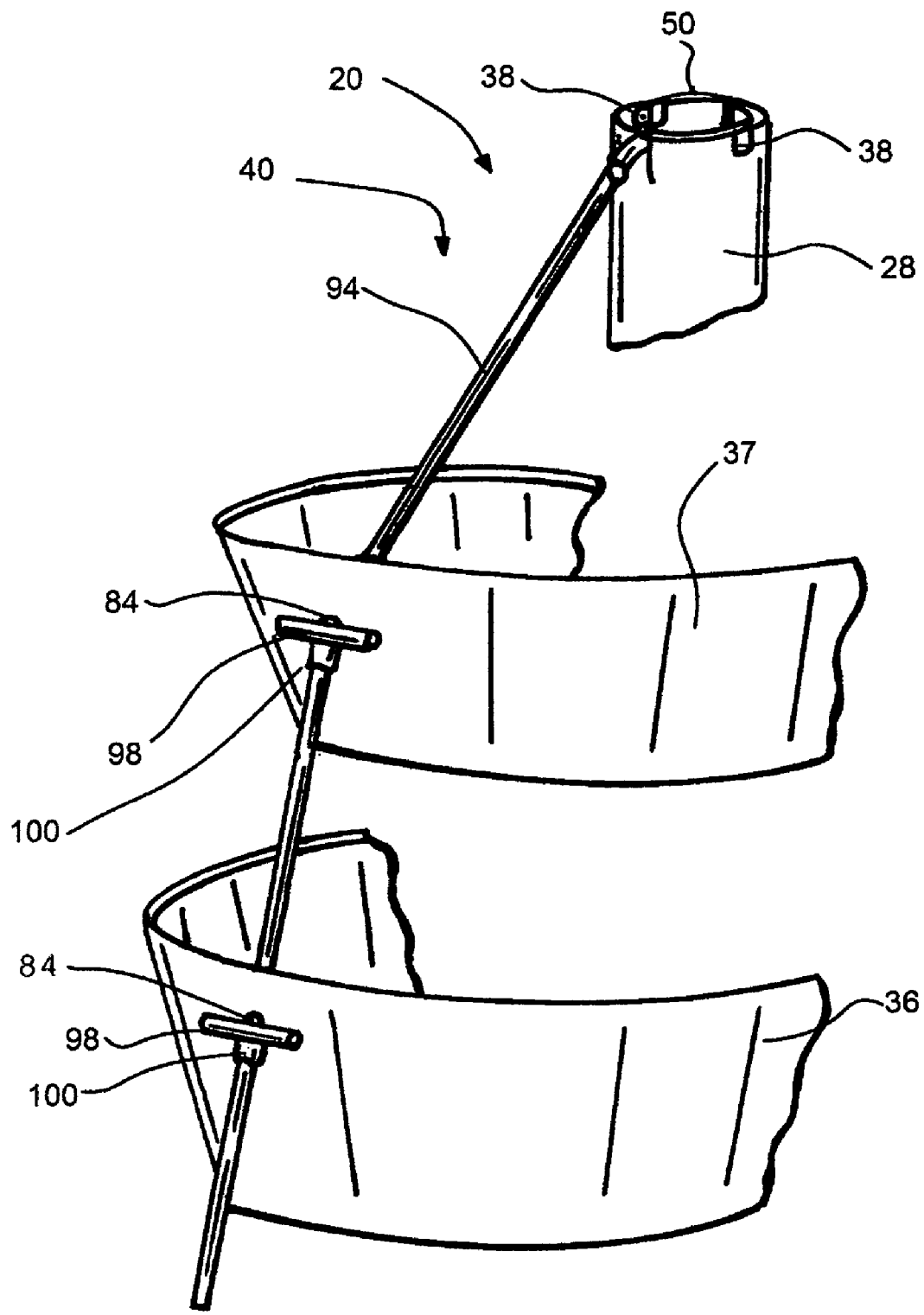
FIG. 5 is a perspective view of fragments of various components of the FIG. 1 planter illustrating how the growing compartments are suspended from the top of the center post of the planter.

For suspension of the growing compartments 31-37 from the top of the center post 28 and with reference to FIGS. 1, 2 and 5, the tension means 40 includes a plurality of (i.e. four) wires 94 which are each provided with a hook 96 (best shown in FIG. 2) at the upper end thereof and which are each threaded through the sequential openings 74, 84 provided in the compartments 31-37 adjacent the edges thereof. At desired spacings along the length of each wire 94 is positioned a pin 98 which is positioned about (i.e. threaded upon) the wire 94 and a clamp 100 which is secured immediately beneath a corresponding pin 98 to prevent the movement of the pin 98 any further downwardly along the wire 94 than the clamp 100. It follows that when the wire 94 is threaded through the sequence of openings 74, 84 provided adjacent the edge of the growing compartments 31-37, the pins 98 can be rotated or pivoted to a position alongside the wire 94 so that the pin 98 is permitted to pass through the openings with the wire 94.

To assemble the planter 20 for use, the stand 22 is put together so that the center post 28 is supported substantially vertically and then the growing compartments 31-37, from largest to smallest, are positioned upon the support post 28 by directing the center holes 76 or 86 of the growing compartments 31-37 downwardly onto the center post 28 from the top thereof. With the compartments 31-37 positioned about the center post 28, the wires 94 are directed hook-end first upwardly through corresponding openings 74 or 84 provided adjacent the edges of the compartments 31-37 until all of the wires 94 are threaded through the compartment openings and so that each growing compartment rests atop a corresponding set of pins 98 disposed along the wires 94. At that point, each hook 96 is hooked within a corresponding notch 38 provided at the top 50 of the center post 28 so that the compartments 31-37 are supported from the top of the post 28 by the wires 94. If desired, the water tube 48 can be routed upwardly through the hollow interior of the post 28 (by way of the post opening 46) and connected to the nipple 62 of the manifold cap 58, and the cap 58 is thereafter positioned upon the top of the post 28.

Figure 6:
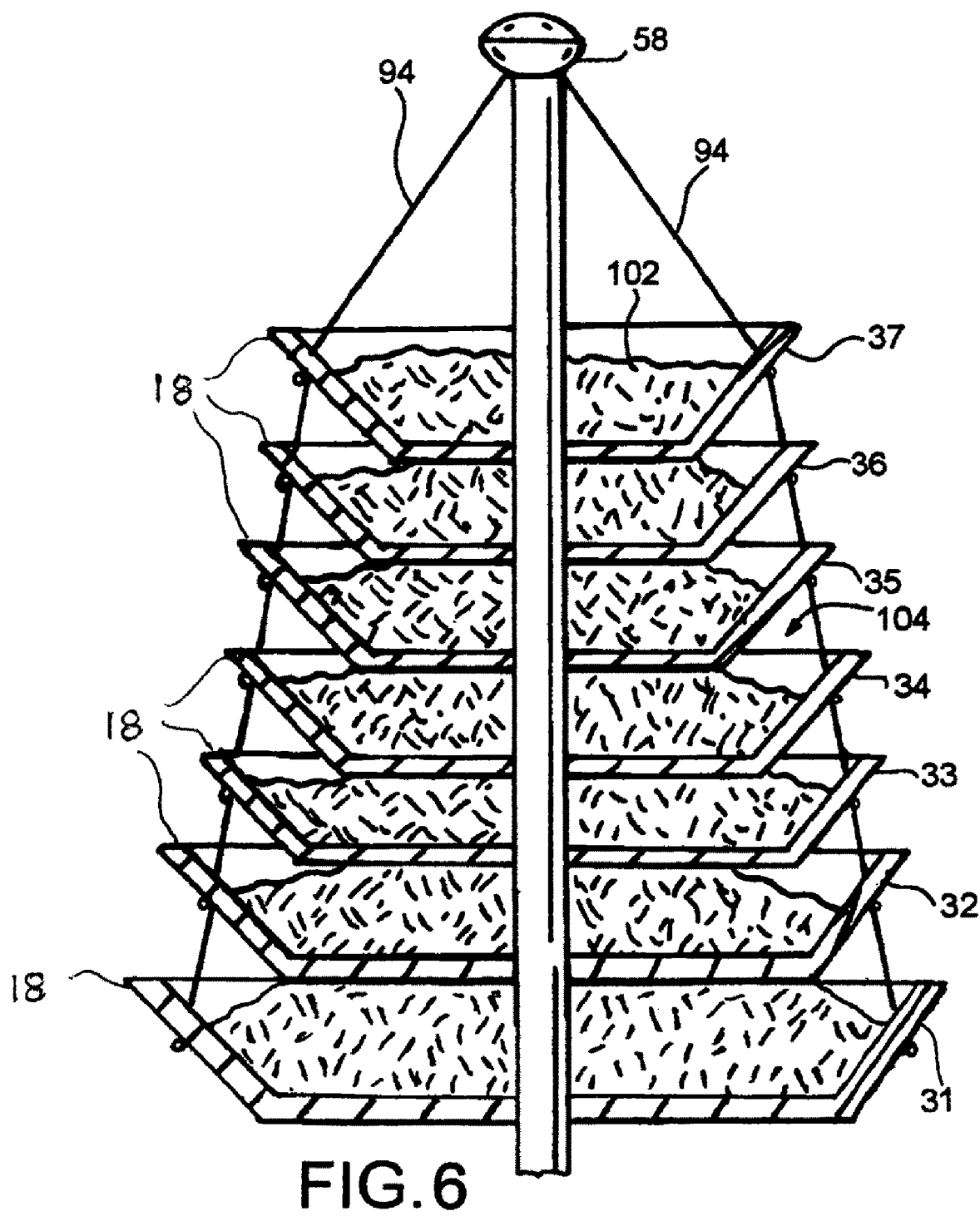
FIG. 6 is a longitudinal cross-sectional view of a fragment of the FIG. 1 planter when filed with dirt or potting soil for growth of plants therein.

To fill the compartments 31-37 with dirt or potting soil, the dirt or potting soil, indicated 102 in FIG. 6, is poured or placed into the uppermost growing compartment 37, and the dirt or soil is permitted to cascade downwardly through the growing compartments 31-36 situated beneath the uppermost growing compartment 37 and come to rest upon the bottom of the lowermost growing compartment 31. The dirt or potting soil continues to be placed or poured into the uppermost growing compartment 37 until all of the growing compartments are filled to a desired level. During the initial filling of the planter 20, one may be compelled to pull the dirt or potting soil away from (i.e. radially outwardly of) the center region of each compartment and toward the peripheral edge 18 of the compartment to ensure that the dirt or potting soil is filled to a desired level within each growing compartment and so that upon completion of the dirt or potting soil-filling process, the dirt or potting soil 102 contained within the various compartments resembles an upwardly-directed column as shown in the view of FIG. 6.

As dirt or potting soil is poured into the upper compartment 37 so as to flow downwardly through the openings 88 of the compartments 31-36 situated below, the poured dirt or potting soil is prevented from gravitationally flowing over the peripheral edges 18 of the compartments 31-36, and the planter 20 is advantageous in this respect. Such a feature is believed to be due, at least in part, to the positional relationship between the openings 88 provided in each growing compartment and the edge portions 72 or 82 situated immediately beneath each compartment and the capacity of dirt or potting soil to normally accumulate in a somewhat conically-shaped pyramid or mound as the dirt or potting soil is poured into a pile. More specifically, the spacing between each adjacent pair of compartments and the vertical arrangement of the edge portions 82 or 72 of each growing compartment relative to the openings 88 provided in each superposed growing compartment 32-37 (i.e. the one situated immediately above the growing compartment being considered) is such that the dirt or potting soil poured into the uppermost compartment 37 so as to flow downwardly through the openings 88 of the compartments 31-36 plugs or clogs up the openings 88 provided in each compartment before the edges of the mound of dirt or potting soil accumulating in the compartment below reaches the peripheral edge 18 thereof.

While a number of factors (such as the vertical spacing between adjacent compartments and the size of the openings 88) are believed to contribute to the aforedescribed feature, it will be understood that the peripheral edge 18 of a compartment being considered is disposed sufficiently outboard of (e.g. radially outboard of) the openings 88 provided in the superposed compartment (i.e. the compartment disposed immediately above the compartment being considered) so that poured dirt or potting soil which flows downwardly through the openings 88 in the superposed compartment and into the compartment being considered will plug or clog the openings 88 in the superposed compartment before the dirt or potting soil being piled up in the compartment being considered reaches the peripheral edge 18 thereof. For example and with reference to the cross-sectional view of FIG. 6, the poured dirt or potting soil which accumulates in the lowermost compartment 31 will plug the openings 88 provided in the superposed compartment 32 before the edges of the accumulated dirt or potting soil reaches the peripheral edge 18 of the compartment 31. While the aforedescribed feature is advantageous in that it reduces the likelihood of undesirable spillage of dirt or potting soil over the peripheral edges 18 of the compartments 31-37 as the planter 20 is filled with dirt or potting soil, it also helps explain why, as described above, a user may be compelled to pull the dirt or potting soil away from the center region of each compartment during the filling of the planter 20 to sufficiently fill that compartment.

As shown in the FIG. 6 view, the plant growing region provided by each compartment is accessible through the gap provided between the sidewalls of the compartment and the sidewalls of the superposed compartment. For example, the plant growing region (provided by the upwardly-facing sections of the accessible dirt or potting soil contained in one compartment 34 is accessible through the gap, indicated generally 104 in FIG. 6, provided between the sidewalls of the compartment 34 and the sidewalls of its superposed compartment 35.

Figures 7, 8:
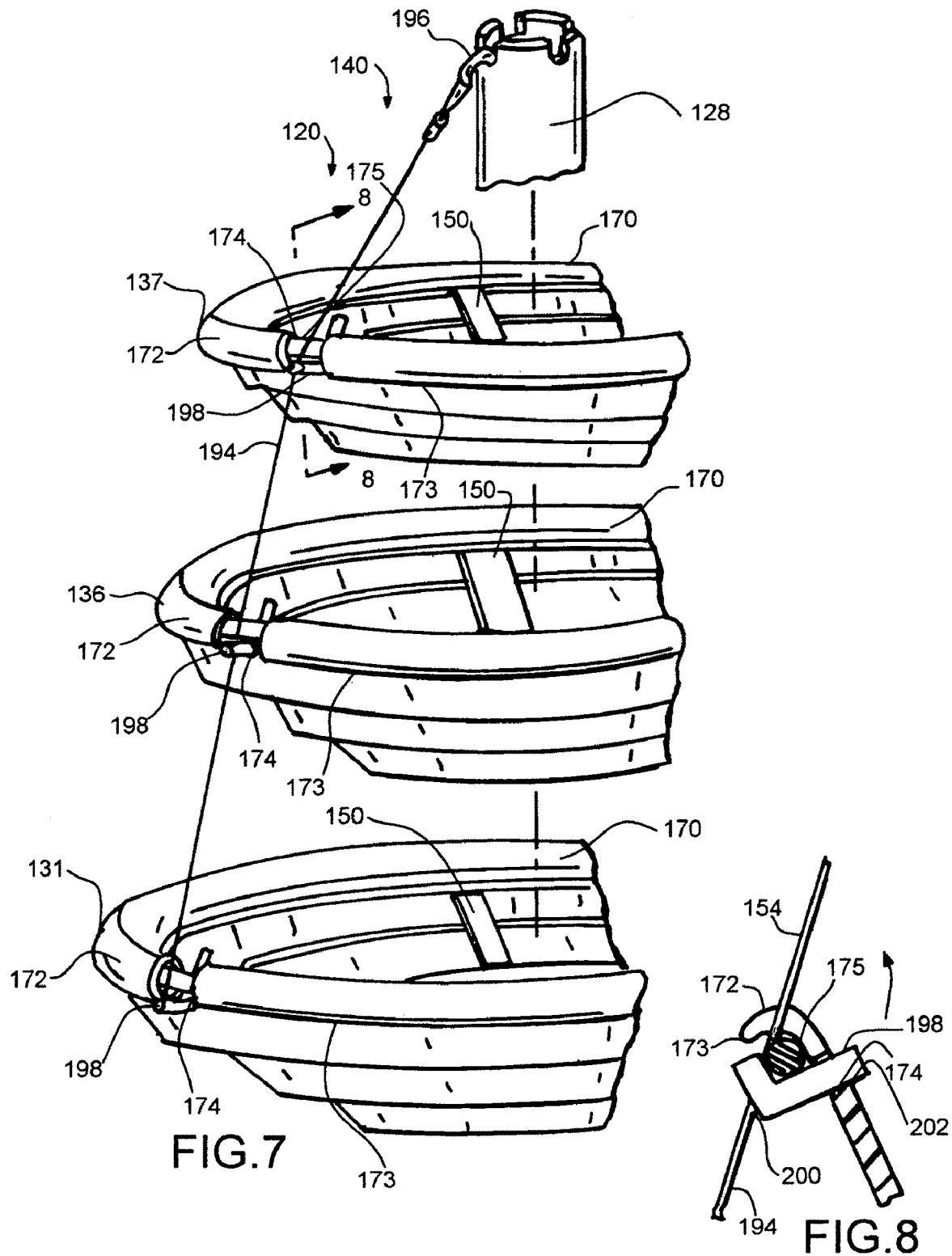
FIG. 7 is a view similar to that of FIG. 5 of components of an alternative planter illustrating an alternative scheme for suspending the growing compartments of the planter from the top of the center post of the planter.
FIG. 8 is a cross-sectional view taken about along line 8-8 of FIG. 7 and drawn to a slightly larger scale.

With reference to FIG. 7, there is illustrated a fragment of an alternative planter, generally indicated 120, having growing compartments, such as those indicated 131, 136 and 137, and which are suspended from the top of a center post 128 of the planter 120 by tension means, generally indicated 140. Each of the growing compartments of the planter 120 includes disc sections 170 which is molded out of a relatively hard plastic material and has an edge portion 172 which extends therearound. The disc section 170 of each growing compartment includes a series of ribs 150 formed therein to enhance its strength, and its edge portion 172 is provided with an arcuate lip portion 173. Also provided along the edge portion 172 are four (only one shown) regularly-spaced cutouts 174 which open radially outwardly of the disc section 170.

Each growing compartment of the planter 120 includes a steel ring 175 which is positionable along the edge portion 172 of the compartment and beneath the lip portion 173 thereof. The steel ring 175 is exposed to view through the cutouts 174 at the four cutout locations provided along the edge portion 172, and as will be apparent herein, the tension means 140 cooperate with the exposed portions of the ring 175 for suspending the compartments from the center post 128.

To this end, the tension means 140 includes four (only one shown) cable wires 194 which are each provided with a hook 196 at the upper end thereof and which are each provided with a series of L-shaped pins 198 joined at spaced locations along the length of the wires 194. As best shown in FIG. 8, each of the L-shaped pins 198 has an opening 200 provided in one leg thereof for accepting the cable wire 194 inserted endwise therethrough, and each pin 198 is tightly secured to the cable wire 194 by a swaging process which compresses the opening-defining leg of the pin 198 about the wire 194 at a desired length therealong so that the pin 198 is thereafter prevented from sliding along the length of the wire 194.

To suspend the growing compartments of the planter 120 from the center post 128, the growing compartments are first directed downwardly along the center post 128 to a location adjacent the base thereof, and then the compartments are suspended in sequence one-at-a-time from the center post 128 beginning with the uppermost compartment, which in this case is compartment 137. Each cable wire 194 can be hooked atop the center port 128 with the hooks 196, and then while grasping the uppermost compartment 137 with one hand and grasping the uppermost pin 198 of one of the cable wires 194 in the other hand, the free leg of the grasped pin 198 can be manipulated beneath an exposed section of the steel ring 175 from the outside thereof and then upwardly through the spacing, indicated 202 in FIG. 8, provided between the ring 175 and the base of the cutout 174. When the uppermost compartment 137 and pin 198 are subsequently released from the grasping hands, the weight of the compartment 137 maintains the pin 198 in a secured condition about the ring 175. This process can be repeated with the remaining three cable wires 194 until the uppermost compartment 137 is supported by all four cable wires 194 at the cutouts 174 provided along the edge portion 172 of the compartment 137.

By repeating the aforedescribed steps to secure the next-to-uppermost growing compartment 136 to the cable wires 154 and then repeating the process again with each compartment downwardly in sequence along the center post 128 to the lowermost compartment 131, all of the growing compartments can be readily secured to the cable wires 154.

A planter such as aforedescribed can possess the following dimensions: The overall height of the planter is about 55.5 inches; the width of the planter (as measured between two diametrically-opposed feet of the base assembly) is about 43 inches; the diameter of the uppermost growing compartment is about 16 inches; the diameter of the lowermost growing compartment is about 22 inches; the depth of the growing compartments can range from between about 3.5 and 4 inches; the spaced distance between the bottoms of adjacent compartments in the series of compartments is about 3 inches; and the overall length of the center post is about 47 inches.

It will be understood that numerous modifications and substitutions can be had to the aforedescribed embodiments 20 and 120 without departing from the spirit of the invention. For example, although each of the growing compartments of each of the aforedescribed embodiments 20 and 120 have been shown and described as having circular peripheral edges 18, growing compartments in accordance with the broader aspects of this invention can possess non-circular peripheral edges. Accordingly, the aforedescribed embodiments 20 and 120 are intended for the purpose of illustration and not as limitation.

The invention claimed is:

1. A planter comprising:
   a center post having a length, a longitudinal axis and a top and which is arranged in a vertical orientation so that its longitudinal axis is oriented vertically;
   a series of growing compartments which are arranged in a sequential and superposed relationship along the length of and below the top of the center post, each of the growing compartments having a center opening through which the center post extends and which is tightly fitted thereabout so that the growing compartments are maintained in a centered relationship about the center post and so that the center opening of each growing compartment cooperates with the center post to prevent any lateral shifting of the compartment with respect to the center post;
   the growing compartments including a lowermost growing compartment and a remainder of growing compartments including an uppermost growing compartment wherein the lowermost growing compartment includes a substantially solid bottom for containing dirt or potting soil placed therein, and the remainder of the growing compartments having bottoms within which openings are defined to accommodate the passage of relatively large clumps of dirt or potting soil through the bottoms thereof so that each of the growing compartments can be filled with dirt or potting soil placed into the uppermost growing compartment; and
   tension members which are joined and maintained in tension between outer edges of the growing compartments and the top of the center post so that the weight of the growing compartments is suspended from the top of the center post by the tension members and so that the weight of the growing compartments is centered about the longitudinal axis of the center post.

2. The planter as defined in claim 1 further including a base adapted to rest upon a floor or underlying support surface for supporting the center post in a vertical orientation.

3. The planter as defined in claim 1 wherein the growing compartments increase in size as a path is traced downwardly along the center post from the top thereof.

4. The planter as defined in claim 1 wherein at least one compartment which is disposed below the uppermost compartment has a peripheral edge which is arranged in such a positional relationship with the openings provided in the bottom of a compartment superposed above said at least one compartment so that dirt or potting soil which is permitted to pass through said openings will plug said openings before the dirt or potting soil being accumulated within said at least one compartment reaches the peripheral edge thereof.

5. The planter as defined in claim 1 wherein the center post includes an upper segment along which the series of growing compartments are arranged and a lower segment, and the planter further includes means for acting between the upper segment and the lower segment of the center post enabling the upper segment to be rotated relative to the lower segment.

6. The planter as defined in claim 1 further including means for conducting water to the top of the center post by way of the interior of the center post for discharge of the water onto the uppermost growing compartment.

7. The planter as defined in claim 6 further including a manifold disposed adjacent the top of the center post which is adapted to accept water flowing to the top of the center post and dispense the water over the uppermost growing compartment in a plurality of water streams.

8. The planter as defined in claim 1 wherein the tension members with which the growing compartments are suspended from the post are constructed of wire.

9. A planter comprising:
   a center post which has a length, a longitudinal axis and a top and is arranged in a vertical orientation so that its longitudinal axis is oriented vertically;

a series of growing compartments which are arranged in a sequential relationship along the length of and below the top of the center post, each of the growing compartments having a center opening through which the center post extends and which is tightly accepted about the center post so that the growing compartments are maintained in a centered relationship about the center post and so that the center opening of each compartment cooperates with the center post to prevent lateral shifting of the compartment with respect to the center post;

the growing compartments including a lowermost growing compartment and a remainder of growing compartments including an uppermost growing compartment wherein the lowermost growing compartment includes a substantially solid bottom for containing dirt or potting soil placed therein, and the remainder of the growing compartments having bottoms within which openings are defined to accommodate the passage of relatively large clumps of dirt or potting soil through the bottoms thereof so that each of the growing compartments can be filled with dirt or potting soil placed into the uppermost growing compartment and which accumulates in sequence in the compartments as a path is traced upwardly through the compartments from the lowermost growing compartment; and tension members which are joined and maintained in tension between outer edges of the growing compartments and the top of the center post so that the weight of the growing compartments is suspended from the top of the center post by the tension members and so that the weight of the growing compartments is centered about the longitudinal axis of the center post.

10. The planter as defined in claim 9 further including a base adapted to rest upon a floor or underlying support surface for supporting the center post in a vertical orientation.

11. The planter as defined in claim 9 wherein the growing compartments have peripheral edges which are each circular in shape, and the growing compartments increase in diameter as a path is traced downwardly along the center post from the top thereof.

12. The planter as defined in claim 9 wherein the openings provided in the bottoms of the remainder of the compartments are large enough to accommodate the passage of clumps of dirt or potting soil possessing a diameter of up to about 1.5 inches.

13. The planter as defined in claim 9 wherein at least one compartment which is disposed below the uppermost compartment has a peripheral edge which is arranged in such a positional relationship with the openings provided in the bottom of a compartment superposed above said at least one compartment so that dirt or potting soil which is permitted to pass through said openings will plug said openings before the dirt or potting soil being accumulated within said at least one compartment reaches the peripheral edge thereof.

14. The planter as defined in claim 9 wherein the center post includes an upper segment along which the series of growing compartments are arranged and a lower segment, and the planter further includes means for acting between the upper segment and the lower segment of the center post enabling the upper segment to be rotated relative to the lower segment.

15. The planter as defined in claim 9 further including means for conducting water to the top of the center post by way of the interior of the center post for discharge of the water onto the uppermost growing compartment.

16. The planter as defined in claim 15 further including a manifold disposed adjacent the top of the center post which is adapted to accept water flowing to the top of the center post and dispense the water over the uppermost growing compartment in a plurality of water streams.

* * * * *